United States Patent [19]
Harada et al.

[11] Patent Number: 5,844,563
[45] Date of Patent: Dec. 1, 1998

[54] METHOD AND SYSTEM FOR INDEXING THREE-DIMENSIONAL SOLID MODEL DATA BASED UPON MODIFICATION HISTORY

[75] Inventors: Tsuyoshi Harada, Funabashi; Hiroshi Matsuoka, Kobe; Shun Shirakawa, Haraikata-machi, all of Japan

[73] Assignee: Ricoh Company, Ltd., Tokyo, Japan

[21] Appl. No.: 527,656

[22] Filed: Sep. 13, 1995

[30] Foreign Application Priority Data

Sep. 13, 1994 [JP] Japan .................................. 6-218402

[51] Int. Cl.$^6$ ................................................. G06T 17/00
[52] U.S. Cl. ............................................................ 345/420
[58] Field of Search .......................... 395/119, 120–129, 395/133, 134, 141; 345/419–429, 433, 434, 441

[56] References Cited

U.S. PATENT DOCUMENTS

| | | | |
|---|---|---|---|
| 5,119,309 | 6/1992 | Cavendish et al. | 364/474.24 |
| 5,345,546 | 9/1994 | Harada et al. | 395/142 |
| 5,615,317 | 3/1997 | Freitag | 395/120 |

FOREIGN PATENT DOCUMENTS

| | | |
|---|---|---|
| 4-220775 | 8/1992 | Japan . |
| 4-243487 | 8/1992 | Japan . |
| 5-46711 | 2/1993 | Japan . |
| 5-250444 | 9/1993 | Japan . |
| 6-124324 | 5/1994 | Japan . |
| 7-98773 | 4/1995 | Japan . |

OTHER PUBLICATIONS

Publication entitled "Design of Solids With Free–Form Surface" by Chiyokura, et al., Computer Graphics, vol. 17, No. 3, Jul. 1983, pp. 289–298.

Publication entitled "UNDO and REDO Operations for Solid Modeling" by Toriya, et al., IEEE CG&A, Apr. 1986, pp. 35–42.

Publication entitled "Solid Modelling with Designbase Theory and Implementation" by Hiroaki Chiyokura, Jan. 1988, pgs. cover, contents and 230–235.

*Primary Examiner*—Almis R. Jankus
*Attorney, Agent, or Firm*—Knoble & Yoshida LLC

[57] ABSTRACT

The current invention discloses the method and the system for designing a three-dimensional model object with an automatic updating feature which correctly and efficiently updates the model object in response to a modification command. In order to efficiently access a part of the object data associated with the modification command, a group of parts in the model object is referred by an index. Such groups include a face set, an edge sequence and a vertex, and these elements are associated to a given modification command by the index. The association between the modification command and the elements via the index provides an efficient yet flexible access to the relevant object data and substantially eliminates the unintended effects during the updating process.

26 Claims, 12 Drawing Sheets

FIG. 10

NODE A :

| COMMAND TYPE : STRAIGHT FACE SWEEPING |
|---|
| COMMAND ID : 1 |
| ELEMENT : FACESET [A-1,A-2,C-1,A-3,B-1] |
| AMOUNT : 100 |
| PRINTERS : B |

NODE B :

| COMMAND TYPE : ROUNDING |
|---|
| COMMAND ID : 2 |
| ELEMENT : EDGESEQ [A-1,A-3,C-1,B-1] |
| METHOD : COMMON RADIUS |
| AMOUNT : 50 |
| PRINTERS : A |

METHOD AND SYSTEM FOR INDEXING THREE-DIMENSIONAL SOLID MODEL DATA BASED UPON MODIFICATION HISTORY

FIELD OF THE INVENTION

The current invention is generally related to a method and a system for indexing a coherent unit of data in a three-dimensional solid model and is particularly related to a method and system that generates a modification history file involving a command, a parameter and an index or a reference to a group of data components affected by the command.

BACKGROUND OF THE INVENTION

Three-dimensional computer graphics have been used in the fields of Computer Aided Design (CAD), Computer Aided Manufacturing (CAM) and Computer Aided Engineering (CAE). In general, applications software in the above fields help design an object or a product in three dimension and test in a virtual world without producing an actual sample. During the design process, the above-described applications software generally allows a designer to view the three-dimensional image from any given view. Some software such as CAE also allows the designer to change attributes such as tensile strength of the material for virtually testing the strength of the model object. Consequently, a designer has the advantages of reducing turnaround time and production costs.

In order to take advantage of the above-described features, the three-dimensional image data is preferably maintained as a solid model. As described in "Design of Solids with Free-Form Surfaces" by Chiyokura et al. in Computer Graphics, pages 289–298, Vol 17, No 3 (1983) as well as "UNDO and REDO Operations for Solid Modeling" by Toriya in IEEE CG & A, pages 35–42, April (1986), the solid model is assumed to contain rigid solids inside the outer surfaces and requires the boundary representations for solid shapes. In comparison to the solid model, other models such as a surface model and a wire frame model may require less amounts of data. However, because of the limited data, these models do not depict every feature of an object as the solid model. Thus, to accurately portray an object, a three-dimensional image should be rendered based upon solid modeling.

In addition to providing an accurate image, a system for designing an object must be flexible so as to facilitate and expedite a design process. For example, the system should be able to maintain a record of changes made to a model object so as to later modify the existing object by reexecuting a certain past command. In this regard, the prior art attempts include the implementation of UNDO and REDO commands in a 3D design system. The last executed command may be cancelled or undone by an UNDO command so as to go back to the image before the last change. On the other hand, a REDO command reexecutes a certain command such as the last executed command. The above UNDO and REDO commands may be combined, and the combination allows a designer to attempt a different parameter such as a different size by cancelling the last command and reexecuting the same command with a new parameter.

In order to further improve the above-described flexibility during the design process, the system may be implemented to accommodate the repeated UNDO and REDO commands to freely move back and forth in the changes made to the model object. By repeating the UNDO commands, the model object traverses the past commands in a backward direction towards the oldest command to sequentially go back to a previous design. In contrast, by repeating the REDO commands, the model object traverses the past commands in a forward direction towards the most recent command to sequentially generate the model object. One use of these repeated UNDO and REDO commands allows the designer to go back to an intermediate design stage where a new design may be developed by modifications without recreating various design stages of the object model. Another advantage of these commands is to generate a modification history data file for the model object over design sessions. For the above reasons, these repeated UNDO and REDO implementations are effective in facilitating and expediting a designing process.

The implementations of these repeatable UNDO and REDO commands in the three-dimensional design system require complex processing. The prior art implementations of the above UNDO and REDO commands include generation and maintenance of tree structured nodes each of which stores a set of a command, a parameter, its command primitives and its reverse command primitives. Each command is actually made of a series of certain primitives or low-level commands to manipulate the solid model data. For example, referring to FIG. 1, to raise a top portion of a frustum 2 to obtain the a flask-shape object 6, one command may be implemented to have eight primitives 4 such as MEV and MEL. MEV stands for "Make an Edge and a Vertex" while MEL stands for "Make an Edge and a Loop." To reverse the effect of each command, a series of other primitives are stored as reverse command primitives. Thus, if a certain executed command stored in a node is to be reexecuted by a REDO command with a new parameter, the corresponding primitives stored in the same node are reexecuted with the new parameter. On the other hand, if a certain executed command is to be cancelled or undone by an UNDO command, the reverse command primitives stored in the node are executed to undo the operation.

FIG. 2 shows a prior art implementation of a design process as disclosed in Japanese Patent 3-78090. Root node $A_0$ of the design representation tree or modification history data is initially generated to represent a null state or a non-existing solid. Second node $A_{1,1}$ is created and linked to the null node to represent the generation of a cube 8 having Face $F_1$. Face $F_1$ is divided into $F_1$ and $F_2$, and Node $A_{1,2}$ represents this division operation. A sweeping command is performed on Face $F_1$ and generates a rectangular block 10 as represented in Node $A_{1,3}$. Finally, Edge $E_1$ of the rectangular block 10 is rounded as recorded in Node $A_{1,4}$.

To modify the current design, for example, a designer repeats two UNDO commands to go back to a previous design phase where a solid has two faces as identified by Node $A_{1,2}$. In response to these commands, the system executes the reverse command primitives stored in Nodes $A_{1,4}$ and $A_{1,3}$ to reproduce the solid 8 at Node $A_{1,2}$. From this design phase, one REDO command of sweeping Face $F_2$ as a new parameter generates a second rectangular block 12 as identified by Node $A_{2,1}$, which is branched from Node $A_{1,2}$. In this variation, Edge E2 of the rectangular block 12 is rounded as indicated by Node $A_{2,2}$. As shown above, the system generates a design modification data structure as a designer modifies the object and allows the designer to trace back and forth among the design modifications.

Another prior art attempt involves automatic updating of an existing model object when a designer changes a part of the existing model object. For example, still referring to FIG. 2, a variation of an existing model object as shown in $A_{1,4}$ is obtained by two UNDO commands and one REDO of sweeping Face $F_1$ with a new parameter to make the projection 14 larger as identified by Node $A_{3,1}$. The updating system then rounds the enlarged projection as indicated by Node $A_{3,2}$ by automatically reexecuting the rounding command as executed between Nodes $A_{1,3}$ and $A_{1,4}$. This automatic updating feature is particularly useful when a model object is complex and a desired modification is performed on a part of the model object that is generated earlier in the design process. Consequently, the designer is free from manually reexecuting the subsequent commands to update or redraw other parts of the model object after the desired modification of a certain part which is deeply imbedded in the tree structure near the root node.

In certain situations, the reexecution or cancellation of a certain command creates a change that necessitates complex updating of other parts of the solid model. For instance, using the above example shown in FIG. 2, from Node $A_{1,4}$, after the two UNDO commands, if the sweeping command is deleted, the updating system should avoid reexecuting the last rounding command in order to prevent an unintended result. Another complex situation may be that if a polygon is swept from Face $F_1$ instead, the rounding operation should be performed but this operation may be confusing since the edge to be rounded may not be clearly identified. Yet another complex updating situation is to change the order of issued commands for an existing model object. For these reasons, the above-described information stored in the linked nodes may not be best suited for complex automatic updating, and the above-described system may not always reproduce an accurate model object as the designer intended.

To solve these problems, the current invention is directed to a method and a system for substantially eliminating the above-described unintended side effects and efficiently accessing the relevant model object data during automatic updating of a three-dimensional model object.

SUMMARY OF THE INVENTION

To solve the above problems, one preferred embodiment of the current invention includes a method of modifying three-dimensional (3D) solid model data, comprising the steps of compiling modification history data for the 3D solid model data, the modification history data including a command, a parameter, and an index being indicative of a part of the 3D solid model data selectively affected by the command; and accessing the part of the 3D solid model data corresponding to the selectively affected part using the index of the modification history data.

According to a second aspect of the current invention, a method of processing for a three-dimensional (3D) solid model using predetermined commands, the 3D solid model being represented by three-dimensional (3D) data, includes the steps of a) generating the 3D solid model by specifying one of the predetermined commands with a parameter, the specified command selectively affecting a part of the 3D solid model; b) generating modification history data for the command in step a), the modification history data including the specified command, the parameter, and an indirect index to the selectively affected part by the command; and c) modifying the 3D solid model using the indirect index of the modification history data, the indirect index accessing a part of the 3D data corresponding to the selectively affected part of the 3D solid model.

According to a third aspect of the current invention, a three-dimensional (3D) design system for a three-dimensional (3D) solid model using three-dimensional (3D) solid model data, includes a modification history compiler for compiling history data so as to account for steps in building the 3D solid model data, the history data for each step including a command, a parameter, and an index to a part of the 3D solid model selectively affected by the command; and a de-reference device for accessing a part of the 3D solid model data corresponding to the selectively affected part using the index of the history data.

According to a fourth aspect of the current invention, a three-dimensional (3D) solid model design system for designing a three-dimensional (3D) solid model using predetermined commands, the 3D solid model being represented by three-dimensional (3D) data, includes a data builder for building the 3D data by executing one of the predetermined commands with a parameter, the command selectively affecting a part of the 3D solid model; a modification history data compiler for generating modification history data which includes the command, the parameter, and an indirect index to the selectively affected part by the command; and a data modifier for modifying the 3D solid model using the indirect index of the modification history data, the indirect index indicative of a part of the 3D data corresponding to the selectively affected part of the 3D solid model.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 10 illustrates some of the information stored in nodes of the current design system.

DETAILED DESCRIPTION OF THE PREFERRED EMBODIMENT(S)

Figure 1:
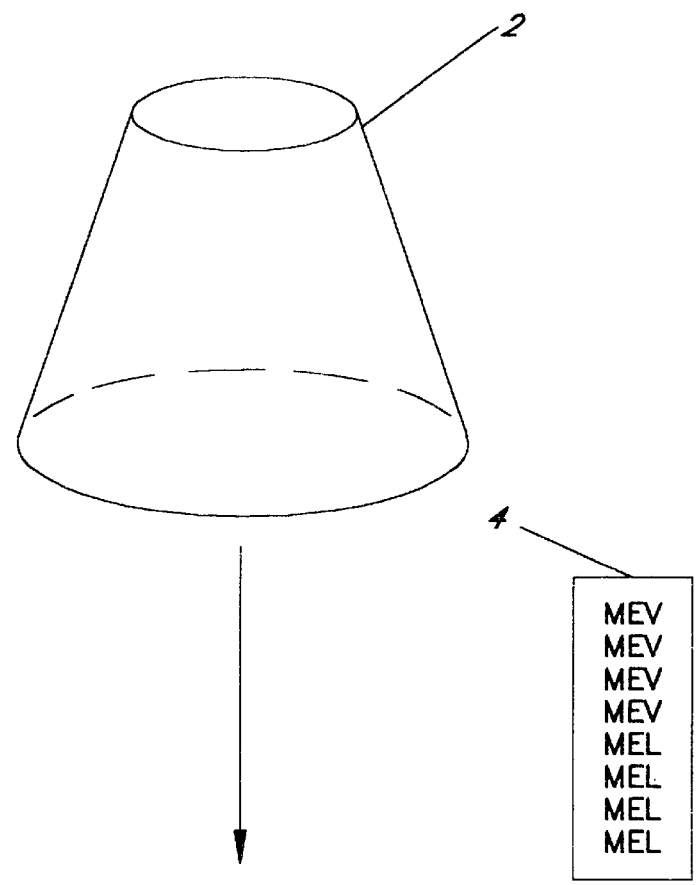
FIG. 1 illustrates that one command for modifying a three-dimensional object consists of a plurality of graphic primitives.
Figure 1:
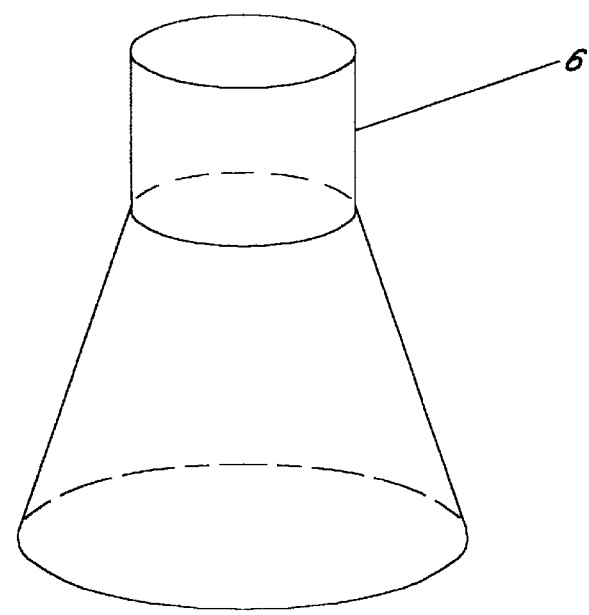
Figure 2:
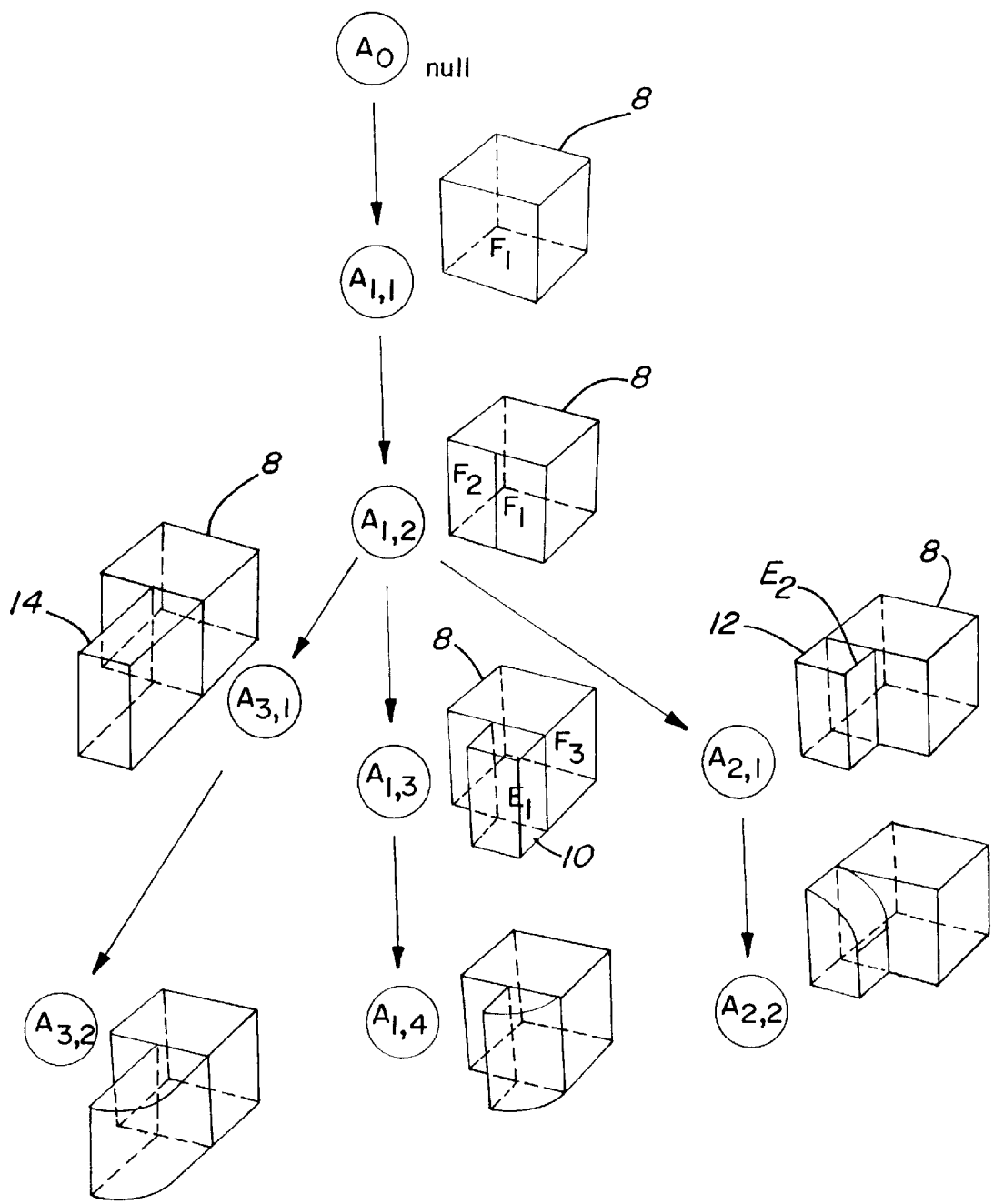
FIG. 2 illustrates a design session where model objects are created by modifying a part of an existing model object and the associated history of the modifications is also generated.
Figure 3:
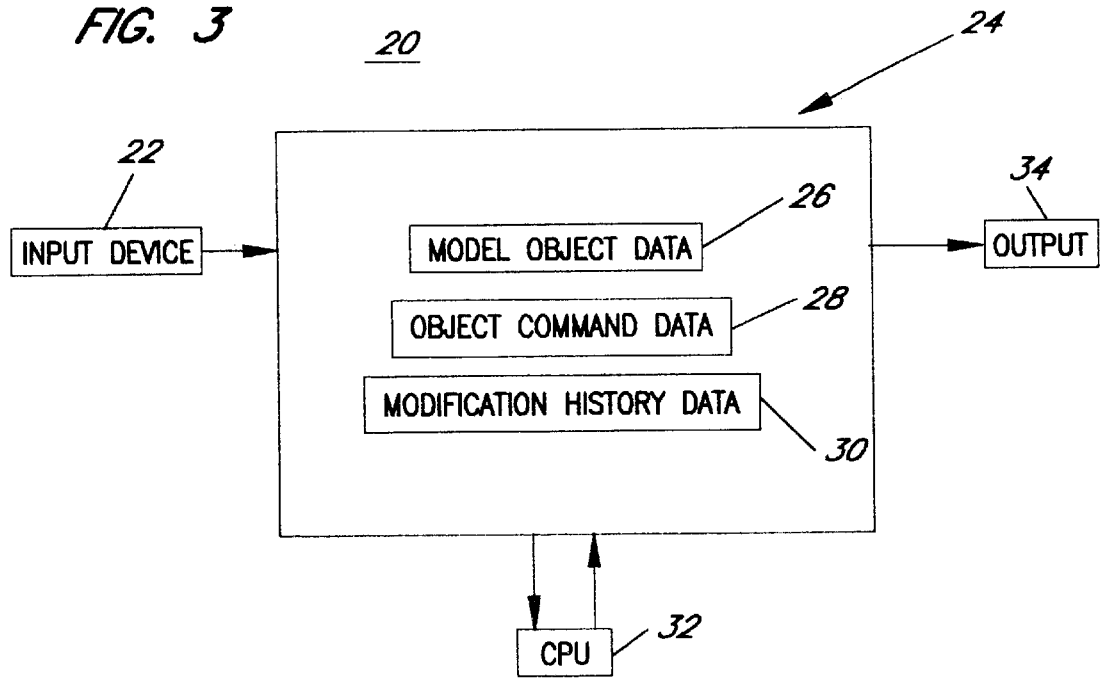
FIG. 3 is a block diagram that depicts core parts of a three dimension design system.

Referring now to the drawings, wherein like reference numerals designate corresponding structure throughout the views, and referring in particular to FIG. 3, one preferred embodiment of the three-dimensional automatic updating design system 20 according to the current invention includes input devices 22, a memory device 24, a central processing (CPU) unit 32 and an output 34. The input devices 22, among other things, include a keyboard and a mouse among other things for a designer to input design data during a design session. The memory device 24 contains data such as a model object data file 26 which represents a model object, an object command data file 28 which provides certain information associated with commands, as well as a modification history data file 30 which stores records of modifications made to the model object. For example, the object command data file 28 includes a table that stores a set of graphics primitives for each command. The modification history data file 30 maintains chronological information on the formation and modification of the model object. In addition, the modification history data file 30 also maintains indices to relevant portions of the model object data for efficient access as will be fully described. A de-reference device retrieves a part of the model object data based upon the index. The above data are used to generate a three-dimensional image by the CPU 32. The generated image is outputted to the output device 34 such as a display or a printer. As a designer generates a model object, a modification history compiler of the above-described design system generates records of commands that the designer issues. Both the de-reference device and the modification history compiler are embodied in software according to one preferred embodiment of the current invention.

Figure 4:
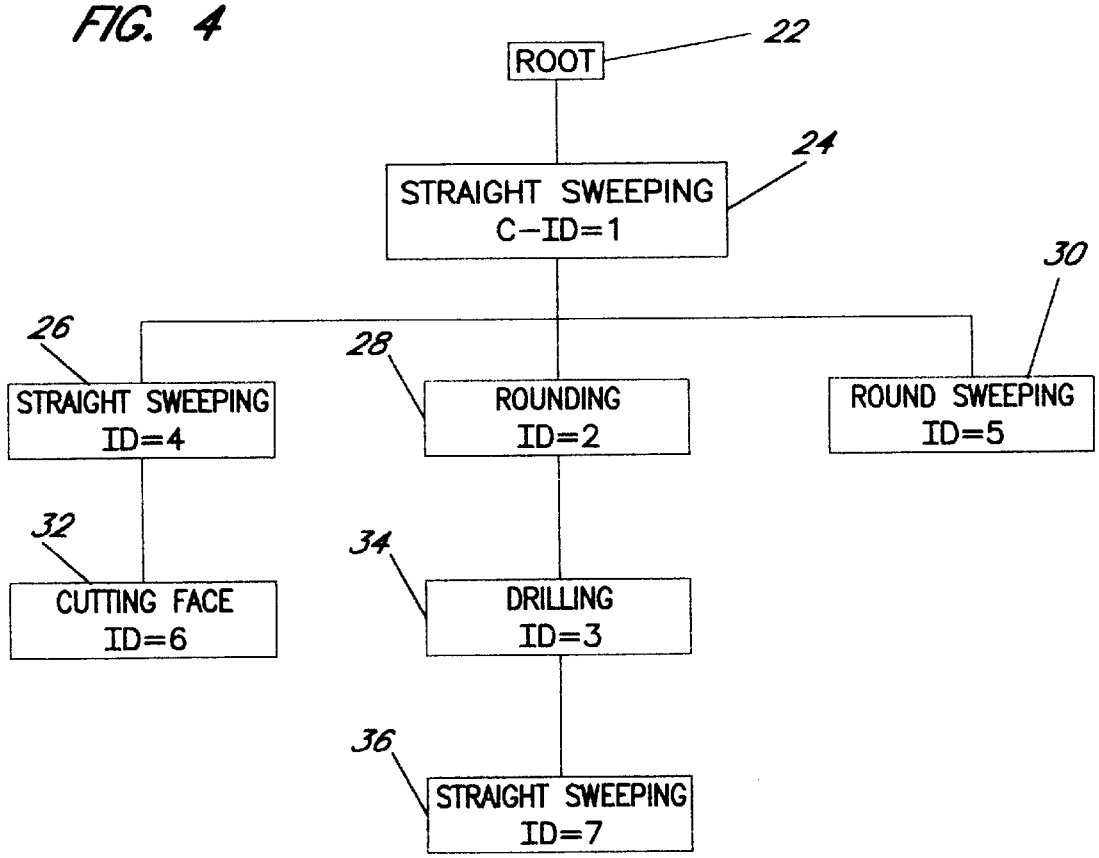
FIG. 4 is an illustration of one modification history data record organized in a tree structure.

Referring to FIG. 4, according to one embodiment of the current invention, such records are organized into a tree structure which includes nodes. Each node consists of certain information including the name of the operation or the command and its corresponding command identification number, and these nodes are linked with each other so that a process of generation and or modification is retraced from one node to another. For example, a node 22 is referred to as a root node in which no information regarding operation is stored, and the root node 22 is internally used to mark a beginning state of a model object. A first command, "straight sweeping" and its command ID of 1 are stored in a node 24. After this command, three nodes 26, 28 and 30 are branched from the node 24 to generate different model objects. Each of these branched nodes is further linked to other nodes, and every node contains the same type of information. Based upon the above constructed tree structured information, in response to a change in one part of a model object, the current design system updates the rest of the model object. However, the above-described information alone is not sufficient for performing complex automatic updating functions.

In order to accommodate complex automatic updating functions in a three-dimensional design system according to the current invention, each of the above-described nodes contain additional information based upon a mathematical concept of the face set or "FaceSet." The face set is a group of curved faces that share a common edge and are connected with $G^1$ continuity as defined by the following equation:

$$S^2_u(O,v) = k(v)S^1_u(1,v) + h(v)S^1_v(1,v)$$

where $S^1$ and $S^2$ are curved faces while $S_u$ and $S_v$ are differential vectors across and along the common edge. $k(v)$ and $h(v)$ are scalar functions with a parameter v of the edge. When the above equation is satisfied, two curved faces $S^1$ and $S^2$ are $G^1$ continuous and are determined to belong to a common face set. Hiroaki Chiyokura, Solid Modelling with DESIGNBASE; Theory and Implementation, p231–234, (1988).

Figure 5:
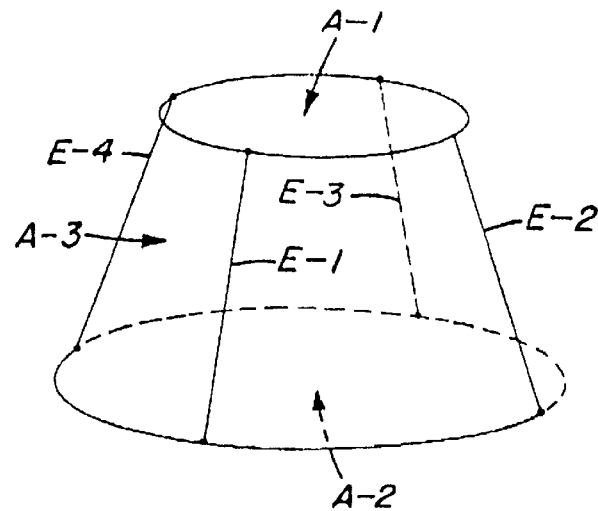
FIG. 5 illustrates a frustum which consists of three groups of faces based upon the definition according to the current invention.

Now referring to FIG. 5, for example, a frustum has a first face set that includes a top face A-1, a second face set that includes a bottom face A-2 and a third face set that includes the side faces A-3. Although the side faces A-3 may be divided into four smaller faces as demarked by the edges E-1, E-2, E-3 and E-4, they belong to a common face set as defined by the above equation. Each face set is treated as a unit for a relevant operation. Because of this unit concept rather than individual curved faces, even when the number of faces in a unit changes, the updating operation will not be adversely affected and will be completed as intended by a designer.

Figure 6:
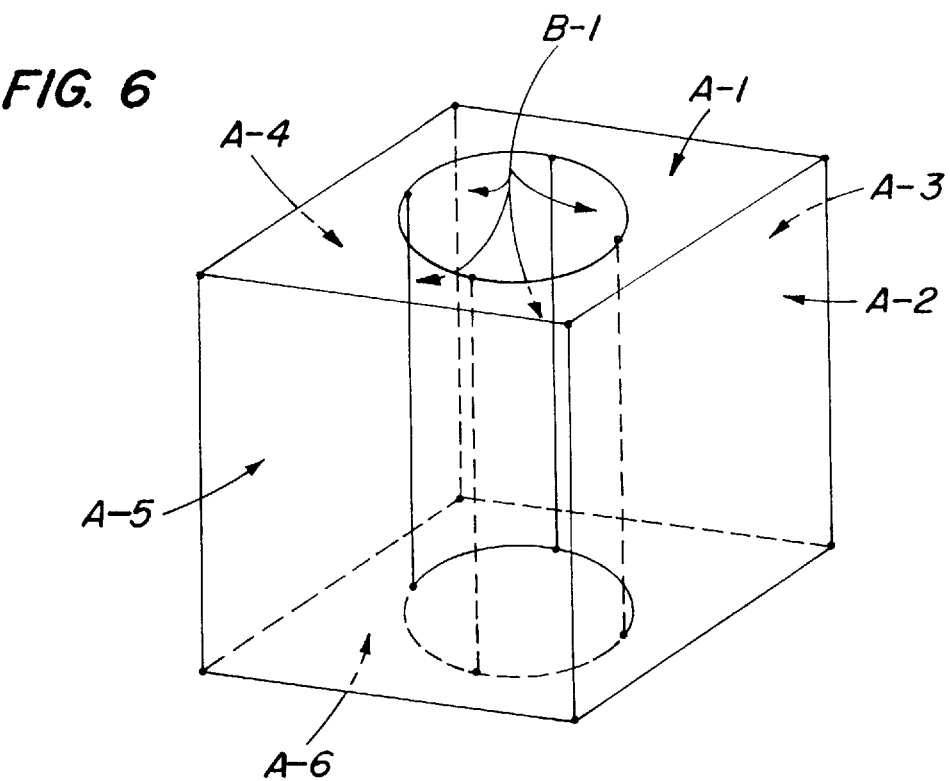
FIG. 6 illustrates how a pair name is determined as a model object is constructed using the design system according to the current invention.

Now referring to FIG. 6, a pair name is assigned to each face of the above-described face set as it is formed by a single operation or command. For example, as a rectangular block is generated by a first command A, six faces are generated by the command A. These six faces are respectively assigned "A-1," "A-2," "A-3," "A-4," "A-5" and "A-6" as pair names. Similarly, when a cylindrical bore is made in the rectangular block by a second command B, inner faces are generated and assigned a pair name "B-1." The above-described pair names are stored in the tree structured nodes as a part of the modification history data. By referring to the pair names, faces associated with a given command are easily identified, and these faces may be updated as necessary during a complex updating procedure. Because of the above-described indirect reference by the pair names, the absolute number of faces or the absolute definitions of faces are not necessary for a design system according to the current invention. In fact, due to the above-described close relation with the command, a list of the pair names for a given command is used as a part of an element list for the command as will be fully described later.

Figure 8:
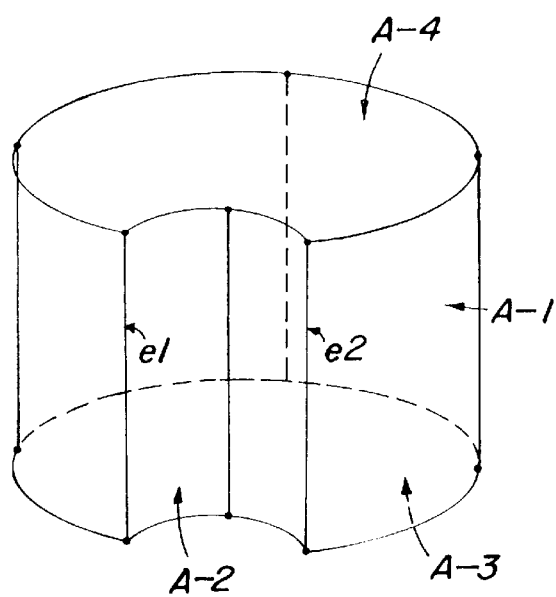
FIG. 8 illustrates how a sub-pair name is determined as a model object is constructed using the design system according to the current invention.

In addition to the above-described pair name, a sub-pair name is used to further differentiate certain parts of a model object. When a single operation or command divides one existing face into multiple faces, a sub-pair name is assigned to each of the newly generated faces. Similarly, the sub-pair name is also assigned to each of the sub-divided edges that are generated by a single division operation or command. According to one preferred embodiment of the current invention, the sub-pair name is a combination of a command ID, a subdivision ID and a total new face/edge number. The command ID indicates the division operation or command. The subdivision ID indicates the identity of a newly divided face or edge with respect to the total number of newly formed faces or edges as indicated by the total new face or edge number. For example, referring to FIG. 8, edges e1 and e2 are both referred to as EdgeSeq [A-1, A-2; A-3; A-4] and cannot be distinguished by the combination of the pair names. However, further combining a sub-pair name, e1 now has a unique edge name EdgeSeq [A-1, A-2; A-3; A-4: A-1/2] while e2 now has a unique edge name EdgeSeq [A-1, A-2; A-3; A-4: A-2/2]. The sub-pair name A-2/1 means that there are two edges that are expressed by the same combination of the pair names and that this sub-pair name uniquely identifies one of the two edges. By the same token, A-2/2 indicates that the sub-pair name uniquely identifies the second of the two edges. The number after the slash in the sub-pair name generally indicates the generation sequence. That is, the smaller the number is, the earlier an object is generated during the operation. Incidentally, a comma is used between pair names that correspond to separate face sets, and a semicolon is used between pair names that belong to the same face set. In other words, the semicolons designate pair names that define a particular face set. A colon is used between a pair name and a sub-pair name. Due to the above-described close relation with a command, the sub-pair names are also used as a part of an element list for the command as will be fully described later.

In order to accurately specify parts of a model object which a given command affects, the following set of identifiers is used as an indirect index according to one preferred embodiment of the current invention. Because the identifiers do not specify the parts in absolute terms or a direct manner, they provide a flexible indexing system. The concept of indirectness will be fully described later with examples of actual operations. The identifier set includes 1) a face set or FaceSet identified by pair names and/or sub-pair names; 2) a sequence of edges or EdgeSeq that are shared by two of the above-defined face sets; and or 3) a vertex that is located at the end of the above edge sequence.

Figure 7:
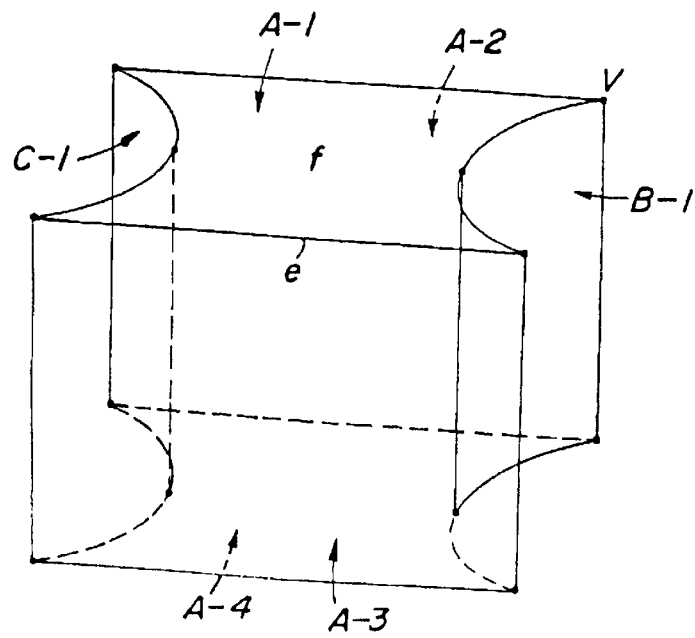
FIG. 7 illustrates how the element names are determined as a model object is constructed using the design system according to the current invention.

These identifiers may be further combined to refer to an element or elements. An element name for a given face set is a combination of its own pair name and other pair names which refer to adjacent face sets. Similarly, an element name for an edge sequence is constructed by combining pair names of face sets that surround the edge sequence and ends of the edge sequence. By the same token, an element name for a vertex or vertices is constructed by combining pair names of face sets that surround the vertex. For example, referring to FIG. 7, the element name for a top face f is FaceSet [A-1; A-2, C-1, A-3, B-1]. Similarly, the element name for an edge e is EdgeSeq [A-1, A-3; C-1; B-1], while the element name for a vertex V is Vertex [A-1, A-2, B-1].

Figure 9:
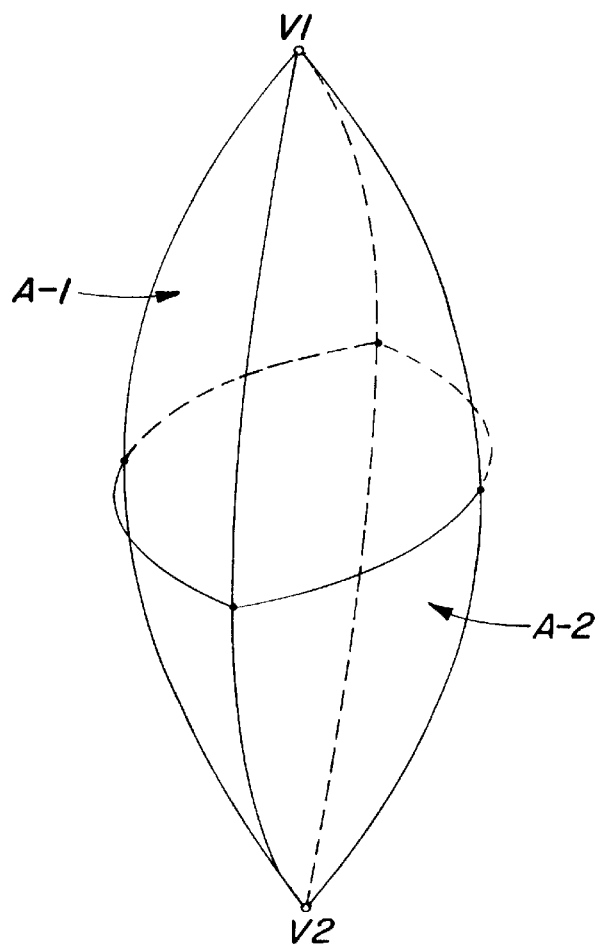
FIG. 9 illustrates how the element names sharing a common pair name are distinguished in a model object using the design system according to the current invention.

Now referring to FIG. 9, when only pair names are used in the element names to refer to vertices V1 and V2, these vertices are both identified as Vertex [A-1, A-2]. The combination of sub-pair names provides unique element names to respectively identify V1 as Vertex [A-1, A-2:1/2] and V2 as Vertex [A-1, A-2:2/2].

As described above, one preferred embodiment according to the current invention provides a unique reference to an element or a group of elements that are associated with a given command. In other words, the given command performs its specified operation upon the elements referred by an indirect index. Because of this indirect indexing feature, when the shape or the total number of the referenced elements is changed, the performance of the given command is not adversely affected. In contrast, a direct index of conventional methods or systems identifies a part of a three-dimensional model object by fixed identification numbers. For example, ascending numbers are uniquely assigned to a group of parts that is affected by a given command. Such a rigid direct indexing often results in unintended modifications to the model object when the command is re-executed following the changes in the shape, the size or the number of the parts. Thus, the indirect indexing of one preferred embodiment according to the current invention substantially eliminates the above-described unintended side effects.

FIG. 10 illustrates sample nodes that store the above-specified information. For example, Node A includes a command type of straight face sweeping, a command ID of 1, an element name of FaceSet [A-1; A-2, C-1, A-3, B-1] and an amount of sweeping of 100 cm. Since the above sweeping command performs sweeping on a face, the face set identified by pair names is provided along with the amount of sweeping. Similarly, Node B includes a command type of rounding, a command ID of 2, an element name of EdgeSeq [A-1, A-3; C-1; B-1], a method of rounding of a common radius, and an amount of rounding with a 50 cm radius. Since the above rounding command performs rounding on an edge, the edge sequence specified by pair names is provided along with the amount of rounding. As described above, all the nodes do not necessarily contain the same information, but rather each node contains appropriate information for a given command. As described before, the element name for a given command functions as an indirect index to actual objects that the command performs its specified operation. In addition to the command specific information, in order to build a history of modifications, each node contains at least one pointer which links to another node. In an alternative embodiment, a plurality of link pointers is stored in a node for multiple branching or bi-directional linking. Because of these pointers, the above-described nodes are organized in a tree structure, and a design system can efficiently access the modification history data file.

Based upon the above-described modification history data, in general, one preferred embodiment of the three-dimensional design system according to the current invention allows a designer to re-execute a past command with a new parameter to modify a part of a model object and to automatically update the rest of the model object in response to the modified part. In order for the designer to select the past command, for example, the system displays a tree structured command history as shown in FIG. 4 or in the alternative, a vertical list of the commands which is not shown. If appropriate, a possible range of the amount for each command is also displayed. The designer selects a particular command or a group of commands via an input device and specifies a new corresponding parameter for re-execution.

Figure 11:
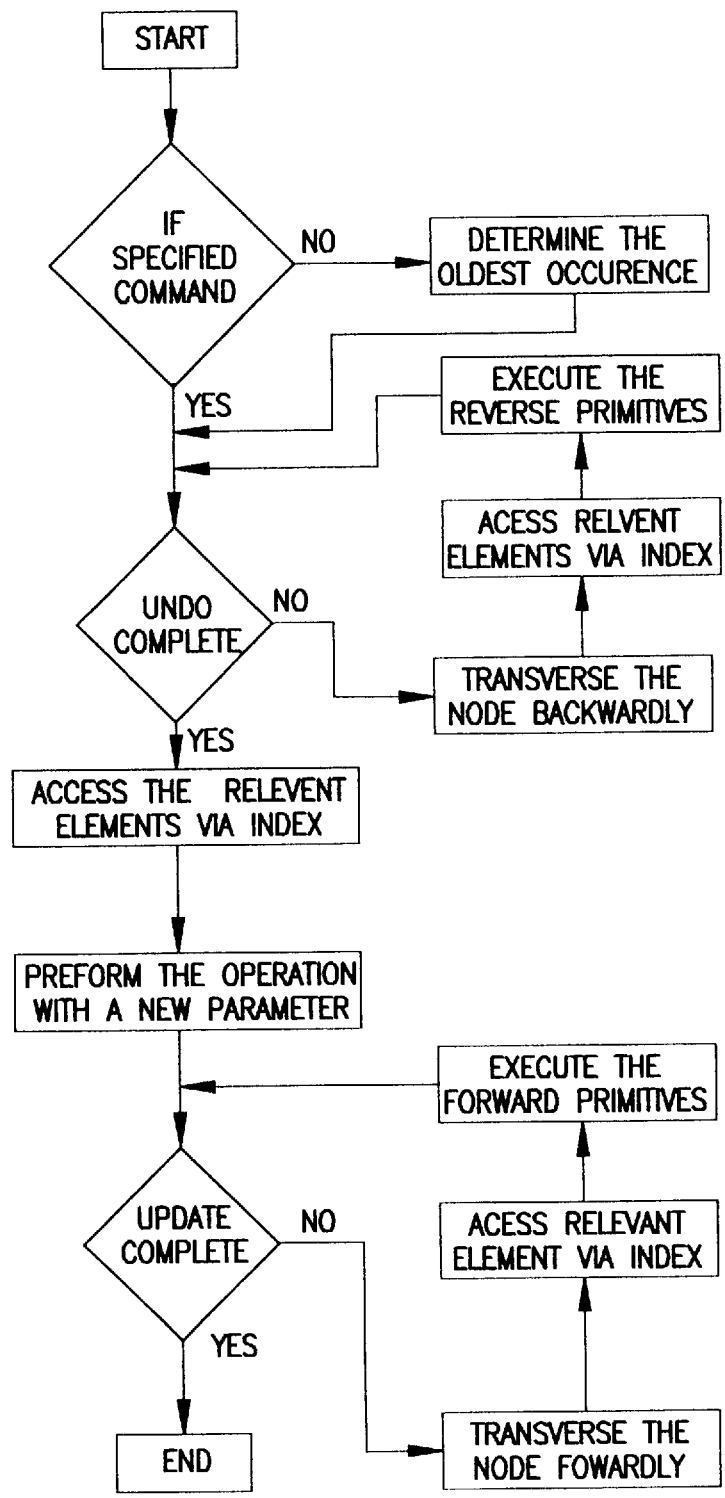
FIG. 11 is a flowchart depicting a series of processes for re-executing a past command so as to modify one part of an existing model object and automatically updating other parts of the model object.

Referring to FIG. 11, in order to re-execute the past command and to automatically update a model object, the current design system performs the following processes. If a designer attempts to re-execute multiple commands with new parameters, the system determines which of these commands is first executed over the course of the design history. On the other hand, if a single command is specified, the system does not perform the above-described step.

Still referring to FIG. 11, when the particular command is determined, the system traverses nodes in the modification history file so as to undo the modifications made to a current model object. In order to actually undo the command, according to one preferred embodiment of the current invention, the reverse primitives stored in each traversed node are performed. The above undoing steps are repeated until the model object reaches a stage where the specified command is to be re-executed. In other words, the past commands in the same branch including the specified command are undone. At this restored node or an initiation node, element data for the specified command are accessed via the stored element name in the corresponding node. Relevant element data are accessed via a stored element name. The element name functions as an index to access the actual data representing the relevant elements in the model object. As described above, the element name includes pair names and sub-pair names for a face set, an edge sequence and a vertex. The specified command operates on the element data based upon the newly specified parameter.

Still referring to FIG. 11, after the above-described re-execution of the specified command, the automatic updating process follows by traversing the linked nodes in a forward direction towards a terminal node. For each traversed node, element data is accessed via a stored index or an element name as described above rather than a direct index, and the stored command is performed on the accessed element data. The above updating process is repeated until the nodes are traversed to the last issued command stored in the terminal node in a particular branch of the tree structure.

In addition to the above-described re-execution, the preferred embodiment of a design system for automatic updating a three-dimensional model object according to the current invention allows a designer to delete a past command. In order for the designer to delete the past command, the system displays a tree structured command history as shown in FIG. 4 or a vertical list of the commands. After the command is specified, as described above with respect to FIG. 11, the current model object is UNDONE as the modification history data is traversed in a direction towards the null node until passed the selected command to be deleted. Then, during the automatic update process, the selected command is skipped and the model object is updated by re-executing the commands stored in the nodes which are traversed towards the terminal node. During the updating process, if an element name does not provide an appropriate access to any model object data, a particular command stored in the corresponding node is not performed since that element is deemed to be deleted or non-existing due to the deleted command.

Lastly, the preferred embodiment for automatic updating according to the current invention also allows a designer to switch the order of past commands. In order to switch the order of the commands, the designer selects the first and the second commands, for example, using the tree structured display. After the two commands are specified, as described above with respect to FIG. 11, the current model object is UNDONE as the modification history data is traversed in a direction towards the null node until passed the older of the two selected commands. Then, during the automatic update process, the younger of the two selected commands is first performed as the model object is updated and then the commands stored in the nodes are traversed towards the terminal node and re-executed. In other words, during this traversing, the older of two commands is performed in place of the younger command. If any model object data is not properly accessed, the command associated with the element data is skipped.

According to an alternative embodiment of the design system according to the current invention, some of the above-described steps may be implemented in an interactive manner. For example, when the automatic updating is to begin, the system asks a designer whether to keep an already existing branch or path of the modification history. If the designer wishes to leave the existing modification data intact, a new branch or path is generated and the above-described re-executions and updates are stored in the newly added nodes in the separate path. Another interactive feature includes that at the conclusion of the above-described updating process, the system once more asks the designer for confirmation whether to keep the just added branch or path of the modification history. If the designer confirms the deletion, the new branch is deleted from the modification history data and the model object just prior to the updating operation is re-generated. In the above-described interactive features, the extent of automatic updating may be also selected. To specify what is to be automatically updated, for example, the designer selects a portion of a model object by a mouse. These interactive features of the design system encourage the designer to attempt various designs without recreating and redesigning intermediate stages of the design process.

Re-Execution Example

Figure 14:
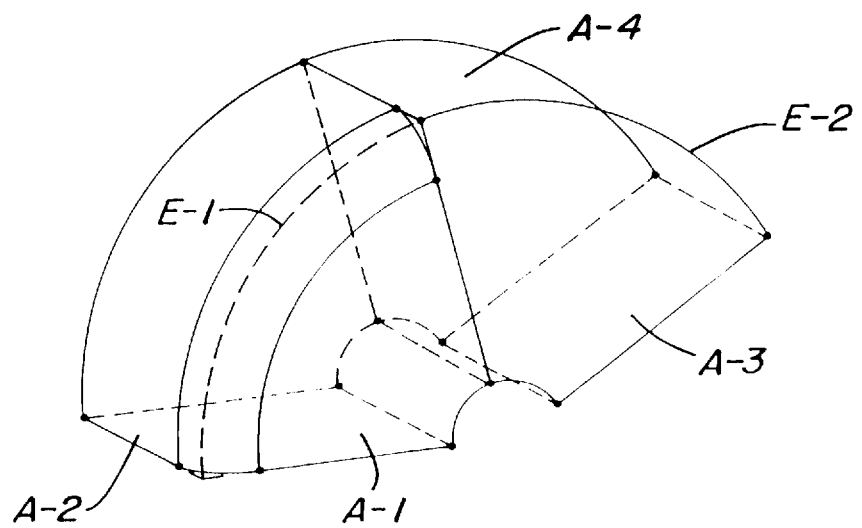
FIG. 14 illustrates a model object that is generated under a prior art design system when the first operation is reexecuted with a new parameter for enlarging the model object as described in FIG. 13.
Figure 12:
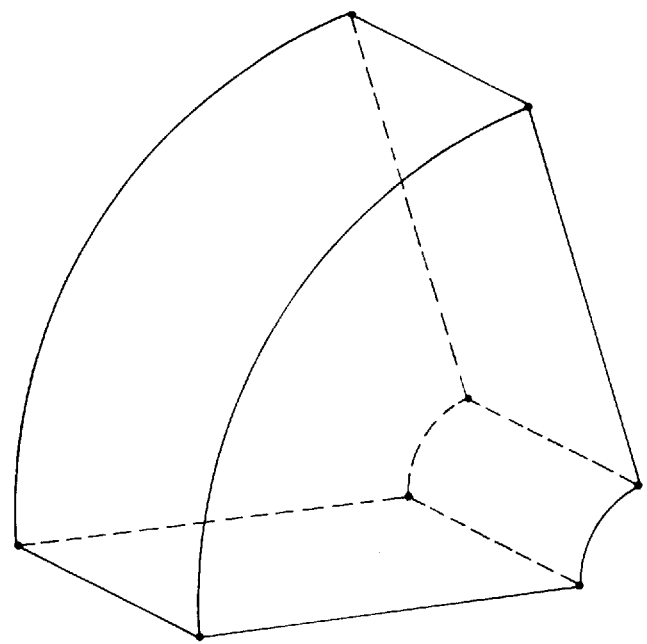
FIG. 12 illustrates a first exemplary model object generated after a rotating sweep operation.
Figure 13:
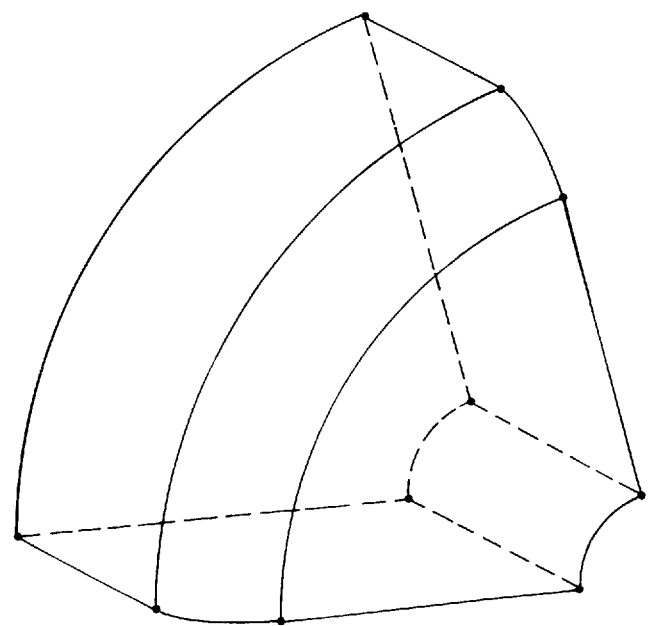
FIG. 13 illustrates the first exemplary model object as shown in FIG. 11 undergoing a rounding operation.

In order to demonstrate the advantages of the current design system, referring to FIGS. 12–20, a comparison is made to a conventional system which causes unintended effects during the automatic updating process. In general, according to one preferred embodiment of the current invention, the symmetry or the relative size of a model object is maintained after a change is made to one part of the object and other parts are updated in response to the change. FIG. 12 illustrates a model object resulted from a rotational sweep command with a first specified angle. FIG. 13 illustrates that one distal edge E-1 as shown in FIG. 12 is rounded by an additional rounding command. When the first sweep command is re-executed with a wider angle under the conventional design system, an expanded model object is created as shown in FIG. 14. However, an unintended rounding is resulted during automatic updating. Because the conventional design system does not use the above-described element name, and the parameter of the second rounding operation is "hard wired" or specified in absolute terms such as an absolute angle, an absolute edge, and absolute vertices, the second operation in the conventional updating process rounds only an edge E-1 between faces A-1 and A-2. As a result, the edge E-2 created by the newly formed faces A-3 and A-4 is left intact during the conventional automatic updating process. The automatic updating process should round the newly created edge E-2.

Figure 15:
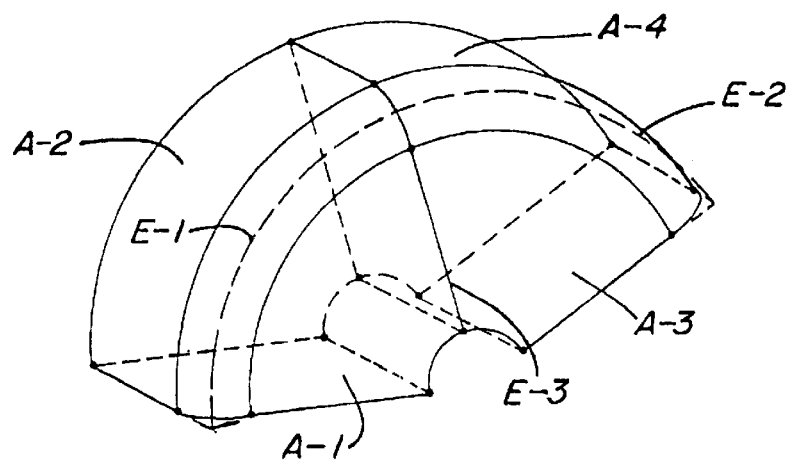
FIG. 15 illustrates a model object generated by the two operations described in FIGS. 12 and 13 and modified by reexecuting the first operation with the increased parameter according to the current invention.

In contrast, under the updating process according to the current invention, the element to be affected by the second rounding command is specified by the more flexible element name. As described above, the element name includes a face set, an edge sequence and or a vertex that are specified by the pair names or the sub-pair names. Since these names are indices to actual model object data, the change caused by the first command does not directly affect the second rounding operation. FIG. 12 shows that an edge E-1 is shared by two face sets: a first face set X consisting of a face A-1 while a second face set Y consists of a face A-2. The second rounding operation is performed on an edge sequence that is specified by the element name including the face sets X and Y. As shown in FIG. 15, faces A-3 and A-4 are formed due to an enlarged angle of the first sweeping operation. The faces A-3 and A-1 now both belong to the first face set X because they are adjacently located each other. The faces A-2 and A-4 now both belong to the second face set Y since they are also adjacently located with each other. These newly defined face sets X and Y in turn define the element name for the second rounding operation. In other words, although the element name for the second rounding operation does not change after the re-execution, the content of the face sets X and Y are changed. Since the element name now includes additional face sets A-3 and A-4, the second rounding operation rounds the original edge E-1 as well as the extended edge E-2 during the automatic updating process.

Deletion Example

Figure 16:
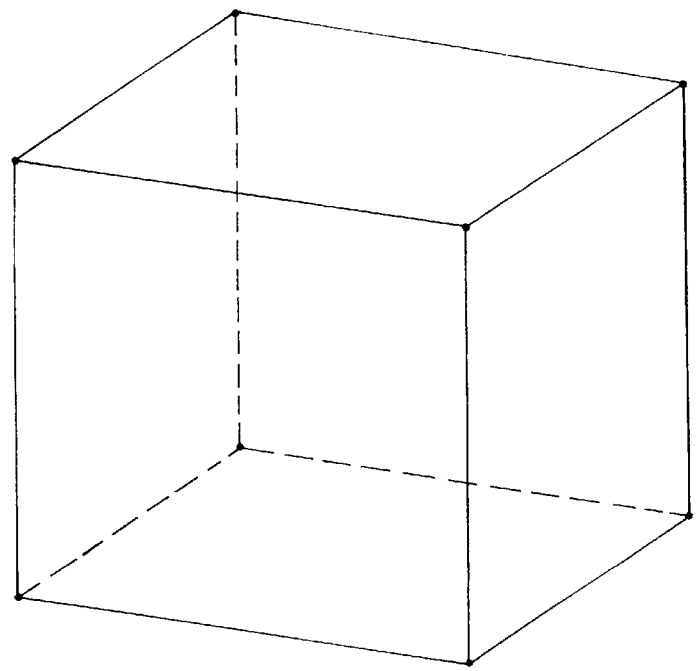
FIG. 16 illustrates a second exemplary model object generated after a straight sweep operation.
Figure 17:
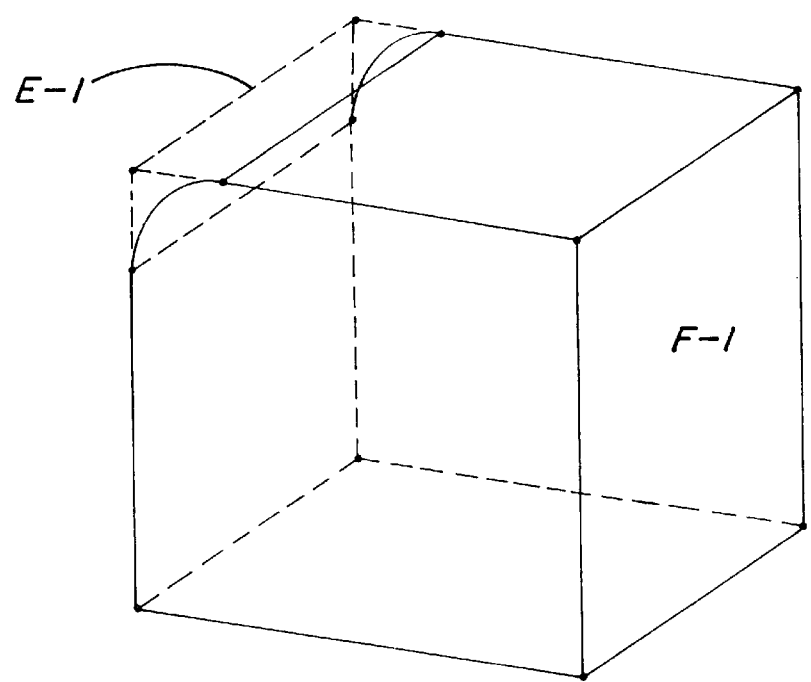
FIG. 17 illustrates the second exemplary model object as shown in FIG. 16 undergoing a rounding operation.
Figure 18:
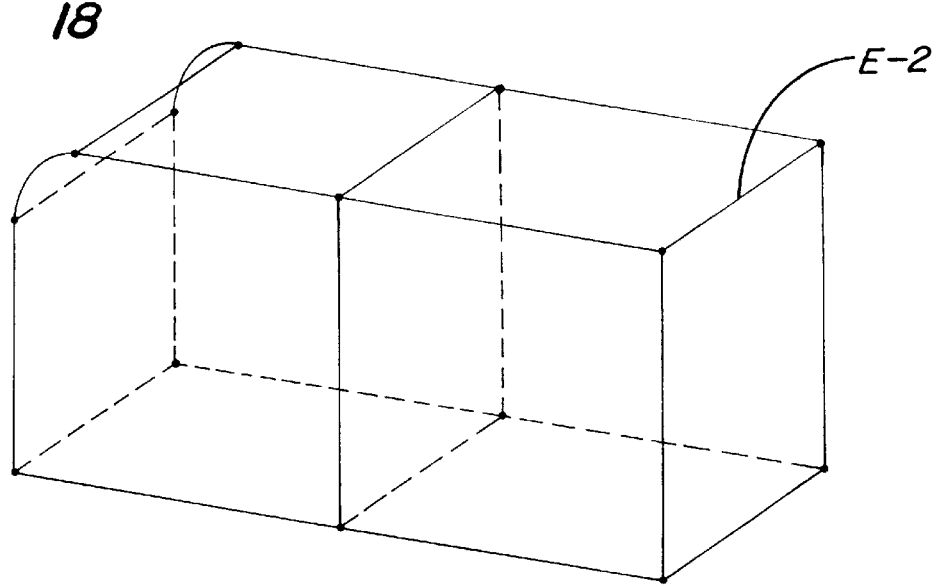
FIG. 18 illustrates the second exemplary model object as shown in FIG. 17 undergoing a second straight sweep operation.
Figure 19:
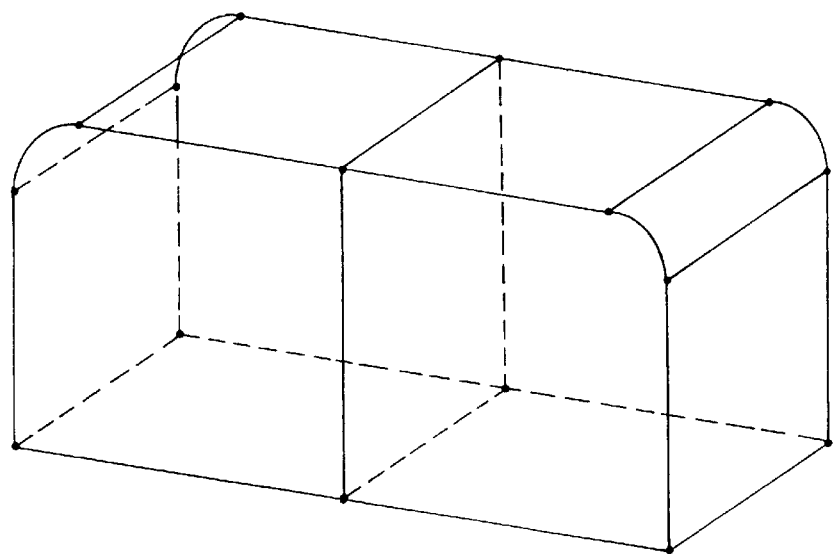
FIG. 19 illustrates the second exemplary model object as shown in FIG. 18 undergoing a second rounding operation.

Referring to FIGS. 16 through 20, the automatic updating process in a preferred embodiment according to the current invention also accommodates the deletion of a command. A model object is generated by the following steps including sweeping a rectangular face as shown in FIG. 16, rounding an edge E-1 as shown in FIG. 17, sweeping a face F-1 opposite the rounded edge as shown in FIG. 18 and finally rounding an edge E-2 of the newly generated solid as shown in FIG. 19. Typically, a conventional system assigns a unique ID number to an edge as it is formed. As edges E-1 and E-2 are formed, they are respectively assigned a unique ID number. In contrast, a rounding operation removes the edges. Thus, when the first rounding operation to remove the edge E-1 is deleted, the edge E-2 is assigned a unique ID number that is different from the one when the first rounding operation takes place. Because of the above-described difference in the ID number for E-2, when the first rounding operation as shown in FIG. 17 is deleted, the second rounding operation cannot be correctly performed under a conventional design system.

In contrast to the above rigid updating, as described above, the current design system has access to the model object data for an edge via an index or an element name. Because of this flexibility, the deletion of the first rounding command does not affect the referenced object and the second rounding command is correctly performed on the edge E-2 without the first rounding operation as shown in FIG. 20.

Switch Example

Using the example illustrated in FIGS. 16 through 19, when the second rounding command and the third sweeping command are switched, under the conventional design system, the edge E-2 is assigned an ID number that is different from the one when the commands are performed in the original sequence. On the other hand, if the above-described switch is performed under the current design system with the above-defined element name, because of the indexing to the edge by pair names, the second rounding command is correctly performed on the edge E-2, and the model object as shown in FIG. 19 is obtained.

Figure 20:
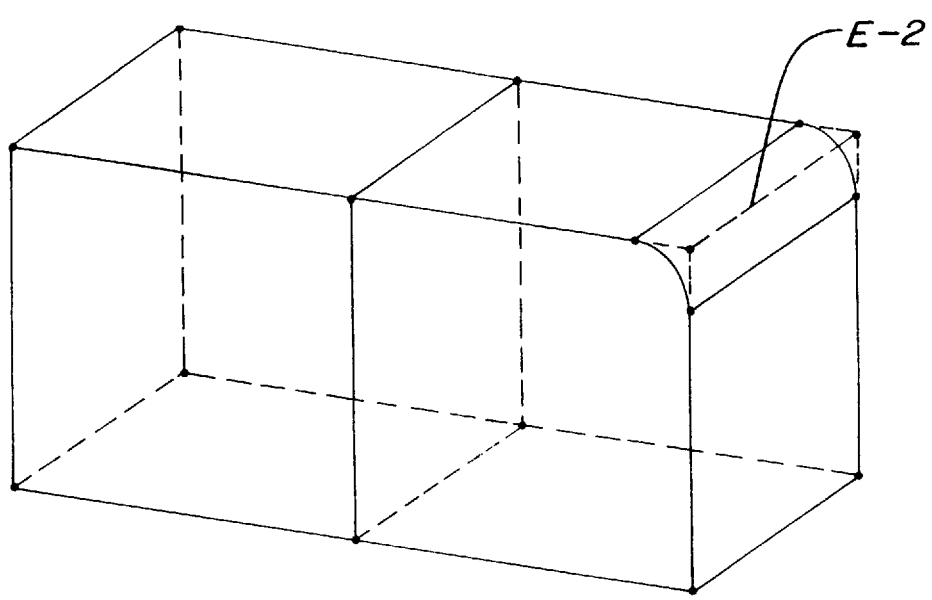
FIG. 20 illustrates the second exemplary model object as shown in FIG. 19 undergoing a modification to delete the first rounding operation and updating the rest of the second model according to the current invention.

Referring to FIG. 20, the three-dimensional design system according to the current invention is diagrammatically illustrated. User-specified commands are inputted to a data builder 40 via an input device 42 to generate model object data in a model object data file 44. The same input is also inputted to a modification history compiler 46 to generate modification history data 48 to keep track of how the model object is constructed. Later, when an existing model object is to be modified, a modification command via the input device 42 is inputted to a data modifier 50. The data modifier updates the three-dimensional data that is referenced by an index stored in a relevant node. The index refers to a portion of the model object data that is selectively affected by a command stored in the above relevant node. To locate the relevant node, a node analyzer 52 analyzes the modification history data file 48. When the relevant index is retrieved, a node analyzer 52 sends a signal indicative of the index to a de-referencing device 56 to enable access to relevant model object data. To complete the update process, a node adjuster re-executes a command to affect the above relevant model object data referenced by the index.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of modifying three-dimensional (3D) solid model data, comprising the steps of:
   a) compiling modification history data for the 3D solid model data, said modification history data including a command, a parameter, and an index being indicative of a part of the 3D solid model data selectively affected by the command; and
   b) accessing the part of the 3D solid model data corresponding to said selectively affected part using said index of said modification history data.

2. The method of modifying the 3D solid model data according to claim 1 wherein said selectively affected part includes at least a group of faces that share an edge as defined by $G_1$ continuity, said group defining a face set, said face set having boundaries.

3. The method of modifying the 3D solid model data according to claim 2 wherein said index includes a first reference to said face set, a second reference to an edge sequence shared by two of said face sets, and a third reference to a vertex shared by two or more of said face sets on said boundaries.

4. The method of modifying the 3D solid model data according to claim 3 further comprising the steps of:
   c) modifying the part of the 3D solid model data accessed by said index; and
   d) adjusting the rest of the 3D solid model data based upon said modification history data in response to said step c).

5. The method of modifying the 3D solid model data according to claim 4 wherein said step d) avoids executing the command if said selectively affected part does not exist.

6. A method of processing for a three-dimensional (3D) solid model using predetermined commands, the 3D solid model being represented by three-dimensional (3D) data, comprising the steps of:
   a) generating the 3D solid model by specifying one of the predetermined commands with a parameter, the specified command selectively affecting a part of the 3D solid model;
   b) generating modification history data for the command in said step a), the modification history data including the specified command, the parameter, and an indirect index to the selectively affected part by the command; and c) modifying the 3D solid model using said indirect index of said modification history data, said indirect index accessing a part of the 3D data corresponding to the selectively affected part of the 3D solid model.

7. The method of maintaining the modification history data according to claim 6 wherein said step c) includes changing the parameter of the command, deleting the command and changing a performance order of the command in the modification history data.

8. The method of maintaining the modification history data according to claim 6 wherein the modification history data is organized in nodes linked in a tree structure, one of the nodes containing a null command and defining a root node.

9. The method of maintaining the modification history data according to claim 6 wherein said step c) further comprises the steps of:

d) determining one of the nodes closest to the root node that contains said indirect index to the selectively affected part by said step c) so as to define an initiation node; and e) reexecuting each of the commands according to the parameters stored in the nodes linked after the initiation node, the 3D data representing the selectively affected part of the 3D model being accessed through said indirect index.

10. The method of maintaining the modification history data according to claim 9 wherein said indirect index refers to a group of faces.

11. The method of maintaining the modification history data according to claim 9 wherein said indirect index refers to a sequence of edges.

12. The method of maintaining the modification history data according to claim 9 wherein said indirect index refers to a vertex.

13. The method of maintaining the modification history data according to claim 6 wherein said step a) is performed by selecting said one of the predetermined commands from a list displaying said predetermined commands.

14. A three-dimensional (3D) design system for a three-dimensional (3D) solid model using three-dimensional (3D) solid model data, comprising:

a modification history compiler for compiling history data so as to account for steps in building the 3D solid model data, the history data for each step including a command, a parameter, and an index to a part of the 3D solid model selectively affected by the command; and a de-reference device for accessing a part of the 3D solid model data corresponding to said selectively affected part using said index of said history data.

15. The 3D design system according to claim 14 wherein said selectively affected part includes at least a group of faces that share a common edge as defined by $G_1$ continuity, said group defining a face set, said face set having boundaries.

16. The 3D design system according to claim 14 wherein said index includes a first reference to said face set, a second reference to an edge sequence shared by two of said face sets on said boundaries, and a third reference to a vertex shared by two or more of said face sets on said boundaries.

17. The 3D design system according to claim 14 further comprising:

data modifier for making modifications to a part of the 3D solid model data accessed by said de-reference device; and updating means for updating the rest of the 3D solid model data based upon said history data in response to said modifications.

18. The 3D design system according to claim 17 wherein said data adjuster avoids executing the command if said selectively affected part does not exist.

19. A three-dimensional (3D) solid model design system for designing a three-dimensional (3D) solid model using predetermined commands, the 3D solid model being represented by a three-dimensional (3D) data, comprising:

a data builder for building the 3D data by executing one of the predetermined commands with a parameter, the command selectively affecting a part of the 3D solid model;

a modification history data compiler for generating modification history data which includes the command, the parameter, and an indirect index to the selectively affected part by the command; and a data modifier for modifying the 3D solid model using said indirect index of said modification history data, said indirect index indicative of a part of the 3D data corresponding to the selectively affected part of the 3D solid model.

20. The 3D solid model design system according to claim 19 wherein said data modifier changes the parameter of the command, deletes the command and changes an order of the command in said modification history data.

21. The 3D solid model design system according to claim 19 wherein said modification history data compiler organizes said modification history data in nodes linked in a tree structure, one of said nodes containing a null command defining a root node.

22. The 3D solid model design system according to claim 21 wherein said data modifier further comprises:

a node analyzer for determining one of the nodes closest to the root node that contains the indirect index to the selectively affected part so as to define an initiation node; and a node adjuster for reexecuting each of the commands according to the parameters stored in the nodes linked after the initiation node, the 3D data representing the selectively affected part of the 3D model being accessed through said indirect index.

23. The 3D solid model design system according to claim 19 wherein said indirect index refers to a set of faces.

24. The 3D solid model design system according to claim 19 wherein said indirect index refers to a sequence of edges.

25. The 3D solid model design system according to claim 19 wherein said indirect index refers to a vertex.

26. The 3D solid model design system according to claim 19 wherein said data builder and said data modifier display said predetermined commands.

* * * * *